(12) United States Patent
Matsumoto et al.

(10) Patent No.: US 9,651,828 B2
(45) Date of Patent: May 16, 2017

(54) LIQUID CRYSTAL DISPLAY DEVICE AND METHOD FOR MANUFACTURING LIQUID CRYSTAL DISPLAY DEVICE

(75) Inventors: Toshihiro Matsumoto, Osaka (JP); Masanobu Mizusaki, Osaka (JP); Masayuki Kanehiro, Osaka (JP); Yuichi Kawahira, Osaka (JP)

(73) Assignee: MERCK PATENT GmbH, Darmstadt (DE)

( * ) Notice: Subject to any disclaimer, the term of this patent is extended or adjusted under 35 U.S.C. 154(b) by 238 days.

(21) Appl. No.: 14/129,481

(22) PCT Filed: Jun. 20, 2012

(86) PCT No.: PCT/JP2012/065681
§ 371 (c)(1),
(2), (4) Date: Dec. 26, 2013

(87) PCT Pub. No.: WO2013/002084
PCT Pub. Date: Jan. 3, 2013

(65) Prior Publication Data
US 2014/0111754 A1    Apr. 24, 2014

(30) Foreign Application Priority Data

Jun. 27, 2011 (JP) .................. 2011-142347
Sep. 13, 2011 (JP) .................. 2011-199613

(51) Int. Cl.
G02F 1/1337 (2006.01)
G02F 1/1333 (2006.01)
G02F 1/137 (2006.01)

(52) U.S. Cl.
CPC ...... *G02F 1/1337* (2013.01); *G02F 1/133723* (2013.01); *G02F 1/133788* (2013.01);
(Continued)

(58) Field of Classification Search
CPC ......... G02F 1/133723; G02F 1/133788; G02F 2202/023; G02F 2001/13775; Y10T 428/1018; Y10T 428/1023
(Continued)

(56) References Cited

U.S. PATENT DOCUMENTS 8,551,358 B2 * 10/2013 Lee .................. C09K 19/12
                                                    252/299.01
8,697,200 B2 *  4/2014 Goetz ............... C09K 19/32
                                                    252/299.5

(Continued)

FOREIGN PATENT DOCUMENTS

JP    2003-307720     10/2003
JP    2009-036861      2/2009
(Continued)

OTHER PUBLICATIONS

International Search Report for corresponding PCT Application No. PCT/JP2012/065681, mailed Aug. 14, 2012 (with English language translation).

(Continued)

*Primary Examiner* — Sophie Hon
(74) *Attorney, Agent, or Firm* — Greer Burns & Crain Ltd.

(57) ABSTRACT

The present invention provides a liquid crystal display device capable of reducing image sticking phenomena and of maintaining the voltage holding ratio, the liquid crystal display device being produced using photo-alignment technology and PSA technology in combination. The liquid crystal display device according to the present invention includes a pair of substrates, a liquid crystal layer disposed between the pair of substrates, an alignment film formed on at least one of the pair of substrates, and a polymer layer for controlling the alignment of liquid crystal molecules formed on the alignment film, wherein the polymer layer is formed (Continued)

by polymerization of one or more species of monomers added in the liquid crystal layer, the polymerization being initiated by radicals generated of the one or more species of monomers upon absorption of light, and the alignment film includes a polymer material having a main chain that contains an imide structure and a side chain that contains a photoreactive functional group, and has undergone a photo-alignment treatment.

12 Claims, 3 Drawing Sheets

(52) U.S. Cl.
CPC .............. *G02F 2001/13775* (2013.01); *G02F 2001/133397* (2013.01); *G02F 2202/023* (2013.01); *Y10T 428/1018* (2015.01); *Y10T 428/1023* (2015.01)

(58) Field of Classification Search
USPC ......... 428/1.2, 1.25–1.26; 349/123–124, 135
See application file for complete search history.

(56) References Cited

U.S. PATENT DOCUMENTS

| | | | | |
|---|---|---|---|---|
| 9,164,325 | B2* | 10/2015 | Mizusaki | G02F 1/133723 |
| 9,181,482 | B2 | 11/2015 | Goetz et al. | |
| 2002/0173155 | A1* | 11/2002 | Hiromasu | G02F 1/13458 |
| | | | | 438/694 |
| 2005/0116200 | A1 | 6/2005 | Nakanishi et al. | |
| 2008/0293888 | A1 | 11/2008 | Bachels et al. | |
| 2011/0051049 | A1 | 3/2011 | Goetz et al. | |
| 2011/0267574 | A1 | 11/2011 | Kawahira et al. | |
| 2012/0008079 | A1 | 1/2012 | Mizusaki et al. | |
| 2012/0033167 | A1* | 2/2012 | Mizusaki | G02F 1/133711 |
| | | | | 349/123 |
| 2012/0076952 | A1 | 3/2012 | Bachels et al. | |
| 2013/0004679 | A1 | 1/2013 | Bachels et al. | |

FOREIGN PATENT DOCUMENTS

| | | | | |
|---|---|---|---|---|
| JP | 2009-520702 | | 5/2009 | |
| JP | WO 2010116564 A1 * | | 10/2010 | ........ G02F 1/133711 |
| JP | 2011-515543 | | 5/2011 | |
| TW | 201000609 | | 1/2010 | |
| WO | WO 2009/156118 | | 12/2009 | |
| WO | 2010/079703 | | 7/2010 | |
| WO | 2010/116551 | | 10/2010 | |

OTHER PUBLICATIONS

Office Action issued by the Taiwanese Patent Office dated Dec. 28, 2015.
Response to Taiwanese Office Action dated Mar. 25, 2016.
Search Report Issued in corresponding Taiwanese Patent Application No. 101123063 dated Nov. 28, 2015.

* cited by examiner

LIQUID CRYSTAL DISPLAY DEVICE AND METHOD FOR MANUFACTURING LIQUID CRYSTAL DISPLAY DEVICE

This application is the U.S. national phase, filed under 35 U.S.C. §371, of International Application No. PCT/JP2012/065681, filed Jun. 20, 2012, which claims priority to Japanese Patent Application No. 2011-142347, filed Jun. 27, 2011 and Japanese Patent Application No. 2011-199613, filed Sep. 13, 2011, the entire contents of all three are incorporated by reference herein.

TECHNICAL FIELD

The present invention relates to a liquid crystal display device, and a method for producing a liquid crystal display device. More specifically, the present invention relates to a liquid crystal display device in which a polymer layer for maintaining the ability of controlling the alignment of liquid crystal is formed on an alignment film, and a method for producing a liquid crystal display device including formation of a polymer layer on an alignment film.

BACKGROUND ART

Liquid crystal display (LCD) devices control transmission/blocking of light (image display on/off) by controlling the alignment of liquid crystal molecules that have birefringence property. For example, liquid crystal molecules are aligned by an alignment film with a rubbed surface which is formed on a face to contact to a liquid crystal layer of a substrate.

Other examples of the method for controlling the alignment of liquid crystal molecules includes multi-domain vertical alignment (MVA) mode, in which the alignment of liquid crystal molecules is controlled by dielectric protrusions provided on an electrode or slits in an electrode as structures for alignment control, without performing an alignment treatment. In MVA mode, the structures for alignment control enable to align liquid crystals in multiple different directions while a voltage is applied to the liquid crystals, even without rubbing treatment on the alignment film. Thus, MVA mode achieves better viewing property than conventional TN mode.

However, the regions with protrusions or slits are likely to have low light transmittance. The regions are allowed to have higher light transmittance by simplifying the arrangement of the structures and increasing the distances between the protrusions or the spaces between the slits. Meanwhile, when the distances between the protrusions or the spaces between the slits are too large, transmission of the tilting of liquid crystal molecules takes a long time. Thus, liquid crystal molecules respond very slowly to application of a voltage necessary for image display to the liquid crystal layer.

For achieving a faster response, a study has been made on a technology of forming a polymer layer on which the tilt direction of liquid crystals is recorded is formed on an alignment film (hereinafter also referred to as polymer sustained alignment (PSA) technology). The polymer layer is formed by injecting a polymerizable monomer-containing liquid crystal composition between substrates, followed by polymerization of the monomer under voltage application (see, for example, Patent Literature 1).

Meanwhile, a photo-alignment technology for achieving better viewing property has recently been studied. This technology enables to control the alignment of liquid crystals in multiple directions under voltage application without rubbing treatment on an alignment film so that excellent viewing property can be achieved. In the photo-alignment technology, optically active materials are used as materials of an alignment film, and the film formed is exposed to light, such as ultraviolet rays, to thereby control the alignment (see, for example, Patent Literature 2).

CITATION LIST

Patent Literature

Patent Literature 1: JP 2003-307720 A
Patent Literature 2: JP 2009-520702 T

SUMMARY OF INVENTION

Technical Problem

As a result of various investigations, the present inventors found the following. If a polymer layer that maintains the alignment controlling ability is formed on an alignment film by injecting a liquid crystal composition including a liquid crystal material, polymerizable monomers, and a polymerization initiator between a pair of substrates and then initiating polymerization under a predetermined condition, continuous display of the same pattern image sometimes causes "image sticking" in the display in conventional PSA technology. Image sticking is a phenomenon where, when an image is displayed for a certain period of time and the image is changed, a faint outline of the previously displayed image remains visible on the screen. Also, after an image is turned on for a long time, spots or unevenness may appear in the image, though no image sticking occurs. Such image sticking, spots or unevenness (hereinafter, also referred to as image sticking phenomena) is considered to occur partly due to presence of electrically-charged substances (ionic impurities or other substances) which change the alignment status of liquid crystals. Such electrically-charged substances may not only include those which are originally present in liquid crystal materials and on the surface of an alignment film but also those which are generated by process factors and those generated by age-dependent degradation of components for a long time.

The present inventors made further investigations and found that, if an alignment film is formed of polymer materials having a main chain that contains an imide structure and a side chain that contains a photoreactive functional group, among alignment film materials applicable to photo-alignment technology, the voltage holding ratio (VHR) of a liquid crystal display device to be produced depends heavily on the kinds of liquid crystal materials under specific production conditions. In other words, in the case of forming an alignment film by photo-alignment treatment, few options are available for the liquid crystal materials, making it difficult to produce highly reliable liquid crystal display devices.

The present invention has been made in consideration of the above current status, and aims to provide a liquid crystal display device capable of reducing image sticking phenomena and of maintaining the voltage holding ratio, the liquid crystal display device being produced using photo-alignment technology and PSA technology in combination.

Solution to Problem

The inventors of the present invention firstly made detailed studies concerning the causes of image sticking phenomena in liquid crystal display devices. Then, they focused their attention on components included in a liquid crystal layer after polymerization. The inventors found out that trace amounts of unreacted monomers, a polymerization initiator, or other components remain in the liquid crystal layer even after completion of a series of polymerization. The inventors further found out that, if easily electrically chargeable substances, such as unreacted monomers and a polymerization initiator, remain in the liquid crystal layer, ionic impurities are generated due to the influence of backlight in typical use after completion of production, or the influence of an aging step for post-assembly inspection. As a result, image sticking phenomena occur in the liquid crystal display.

The inventors have further made various studies on a method for solving the above problem, and focused on materials for forming a polymer layer that maintains the alignment controlling ability. The inventors found out that use of polymerizable monomers which by themselves generate radicals upon absorption of light to thereby be polymerized, as polymerizable monomers for polymer layer formation, enables not only to initiate polymerization without using a polymerization initiator but also to reduce occurrence of image sticking phenomena and further to provide a highly reliable liquid crystal display device without depending on the liquid crystal materials. Accordingly, the inventors have successfully solved the above problem and completed the present invention.

That is, one aspect of the present invention is a liquid crystal display device including a pair of substrates, a liquid crystal layer disposed between the pair of substrates, an alignment film formed on at least one of the pair of substrates, and a polymer layer for controlling the alignment of liquid crystal molecules formed on the alignment film, wherein the polymer layer is formed by polymerization of one or more species of monomers added in the liquid crystal layer, the polymerization being initiated by radicals generated of the one or more species of monomers upon absorption of light, and the alignment film includes a polymer material having a main chain that contains an imide structure and a side chain that contains a photoreactive functional group, and has undergone a photo-alignment treatment.

One of the pair of substrates serves as an array substrate, and the other serves as a color filter substrate, for example. The array substrate is provided with a plurality of pixel electrodes so that the alignment of the liquid crystals is controlled in each pixel. In the color filter substrate, a plurality of colors of color filters are disposed at positions overlapping the pixel electrodes in the array substrate, and colors to be displayed are controlled in each pixel.

An alignment film is formed on at least one of the pair of substrates. The alignment film includes a polymer material having a main chain that contains an imide structure and a side chain that contains a photoreactive functional group, and has undergone a photo-alignment treatment. Photo-alignment treatment using the polymer material having a side chain that contains a photoreactive functional group enables easy formation of a photo-alignment film. Examples of such alignment film include an alignment film formed of polymer materials containing a photoreactive functional group that absorbs light including a component with a wavelength of 300 nm or longer. Also, the alignment film aligns the liquid crystal molecules in a substantially vertical or horizontal direction to the surface of the alignment film.

As used herein, the term "substantially vertical" specifically means 85 to 90°, and the term "substantially horizontal" specifically means 0 to 5°.

A polymer layer for controlling the alignment of liquid crystal molecules is formed on the alignment film. The polymer layer is formed by polymerization of one or more species of monomers added in the liquid crystal layer, the polymerization being initiated by radicals generated of the one or more species of monomers upon absorption of light. Since the polymer layer is formed by polymerization without using a polymerization initiator in the present invention, the display properties are not changed by the influence of unreacted polymerization initiator residues. Therefore, occurrence of image sticking phenomena on the display can be reduced.

Due to the polymer layer formed, even if the alignment film has not undergone an alignment treatment, the liquid crystal molecules adjacent to the alignment film and the polymer layer can be initially tilted in a certain direction. For example, in the case that a liquid crystal composition containing a liquid crystal material and one or more species of monomers is enclosed in a panel, and then the monomer is polymerized with the liquid crystal molecules aligned at a pretilt angle under voltage application to form a polymer layer, the formed polymer layer has a structure to allow the liquid crystal molecules to align in the pretilt angle, regardless of whether the alignment film has undergone an alignment treatment.

Such polymer layer as mentioned above enables also to prevent degradation of the liquid crystal layer caused by backlight in typical use after completion of production.

The configuration of the liquid crystal display device of the present invention is not especially limited by other components as long as it essentially includes such components.

Another aspect of the present invention is a method for producing a liquid crystal display device including the steps of:

injecting a liquid crystal composition containing a liquid crystal material and one or more species of monomers between a pair of substrates;

forming an alignment film by applying an alignment film material to at least one of the pair of substrates and subjecting the alignment film material to a photo-alignment treatment; and forming a polymer layer for controlling the alignment of liquid crystal molecules on the alignment film by exposing the liquid crystal composition to light to allow at least one of the one or more species of monomers to generate radicals to initiate polymerization.

The features of liquid crystal display devices to be produced by the production method according to the present invention are the same as those described for the liquid crystal display device of the present invention. Namely, examples of the photo-alignment treatment include exposing the alignment film material to light including a component with a wavelength of 300 nm or longer.

In the case that a monomer that generates radicals upon absorption of light to be polymerized is used as a material for forming a polymer layer that is formed on an alignment film and controls the alignment of the liquid crystal molecules, the polymerization is initiated without a polymerization initiator. Thus, the display properties are not changed by the influence of unreacted polymerization initiator residues, enabling to reduce occurrence of image sticking phenomena on the display.

The method for producing a liquid crystal display device according to the present invention is not especially limited as long as these steps are included. The production method may include other steps. The step of forming a polymer layer may include light irradiation to the liquid crystal layer to which a threshold or higher voltage is applied to initiate the polymerization, or may include light irradiation to the liquid crystal layer to which a threshold or higher voltage is not applied to initiate the polymerization.

Preferable embodiments of the liquid crystal display device and the method for producing the liquid crystal display device of the present invention are mentioned in more detail below.

The photoreactive functional group preferably absorbs light including a component with a wavelength of 300 nm or longer. Specifically, the photoreactive functional group includes at least one selected from the group consisting of a cinnamate group, a coumarin group, a chalkone group, a tolane group, and an azo benzene group, and the main chain has an imidization ratio of less than 50%. Namely, the alignment film is provided with properties to control the alignment of liquid crystal molecules by photo-alignment treatment, and has a controlled imidization ratio. Examples of the polymer material having an imide structure include polyimides and polyamic acids. The term "imidization ratio" herein refers to a ratio (mol %) of a NH group and a carboxyl group that are dehydrated or cyclized by imidization in a polyamic acid which is a precursor of a polyimide compound. Photo-alignment treatment on the polymer material having a side chain that contains a photoreactive functional group enables easy formation of a photo-alignment film.

The present invention enables to provide a highly reliable liquid crystal display device that can suppress occurrence of image sticking phenomena without depending on the liquid crystal material, even if an imide compound that has a main chain having an imidization ratio of less than 50% is used as a main component of the alignment film.

The one or more species of monomers preferably generate radicals upon exposure to light including a component with a wavelength of 330 nm or longer, more preferably 340 nm or longer, and still more preferably 380 nm or shorter. FIG. 3 is a graph showing a relationship between the transmittance (%) of an alignment film-formed substrate and the absorbances (a.u.) of monomers of Reference Examples 1 and 2. As shown in FIG. 3, conventionally, monomers (for example, Reference Example 2) that generate radicals upon exposure to light having a wavelength of 320 nm or shorter are widely used. However, a substrate having an alignment film on the surface thereof to be typically used in liquid crystal display devices tends not to allow penetration of light having a wavelength shorter than 330 nm, due to the influences of a main chain and a side chain of a polymer that forms the alignment film. For this reason, the monomer of Reference Example 2 needs to be exposed to ultraviolet rays having a wavelength of 310 nm for a long time or a plurality of times for sufficient photopolymerization. Such exposure to ultraviolet rays for a long time or a plurality of times accelerates degradation of members (for example, alignment film and liquid crystal layer) of the liquid crystal display device, possibly causing defects such as image sticking phenomena. Meanwhile, in the case that exposure to ultraviolet rays is performed only for a short time so as to prevent degradation of the alignment film and the liquid crystal layer, the monomer is not sufficiently polymerized so that a defective polymer layer is formed, possibly causing defects such as image sticking phenomena. Moreover, many of typical ultraviolet ray sources emit light having a wavelength of 310 nm with low intensity and emit light having a wavelength of 330 nm or longer with high intensity. FIG. 4 is a graph showing an emission spectrum of a typical ultraviolet ray source. As shown in FIG. 3, use of a monomer (for example, Reference Example 1) that absorbs light including a component with a wavelength of 330 nm or longer enables to further enhance the light-use efficiency, which in turn enables to form a stable polymer layer even through single short-term exposure to light.

The one or more species of monomers are preferably bifunctional monomers. Use of bifunctional monomers enables to form a stable polymer layer for covering the surface of the alignment film even through exposure to light for a shorter time as compared to the case of using monofunctional monomers. Moreover, a high voltage holding ratio (VHR) can be maintained after long time use of the liquid crystal display device.

The one or more species of monomers are preferably condensed aromatic compounds represented by the following chemical formula (1):

[Chem. 1]

$$P^1-A^1-P^1 \qquad (1)$$

wherein $P^1$s are each independently an acrylate group or a methacrylate group; and $A^1$ is one of groups represented by the following chemical formulae (2-1) to (2-4):

[Chem. 2]

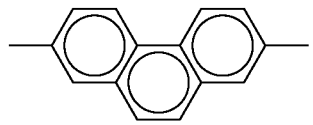

(2-1)

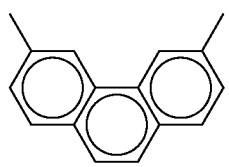

(2-2)

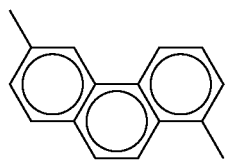

(2-3)

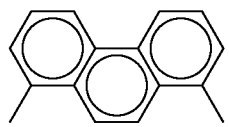

(2-4)

wherein a hydrogen atom in $A^1$ may be substituted with a halogen group, a methyl group, an ethyl group, or a propyl group. In the case that the monomer has a phenanthrene condensed ring represented by the above chemical formulae (2-1) to (2-4), the monomers can absorb light having a wavelength longer than 330 nm. Therefore, the monomers can achieve a higher light-use efficiency as compared to other compounds, and enable formation of a stable polymer layer.

Other examples of the one or more species of monomers include compounds represented by the following chemical formula (3):

[Chem. 3]

$$P^2-A^2-P^2 \quad (3)$$

wherein $P^2$s are each independently an acrylate group or a methacrylate group; and $A^2$ is a group represented by the following chemical formula (4):

[Chem. 4]

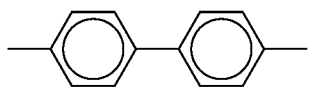

(4)

wherein a hydrogen atom in $A^2$ may be substituted with a halogen group, a methyl group, an ethyl group, or a propyl group.

Advantageous Effects of Invention

The liquid crystal display device according to the present invention can not only prevent occurrence of image sticking phenomena but also prevent reduction in the voltage holding ratio, and thus enables to achieve excellent image display quality.

DESCRIPTION OF EMBODIMENTS

Figure 1:
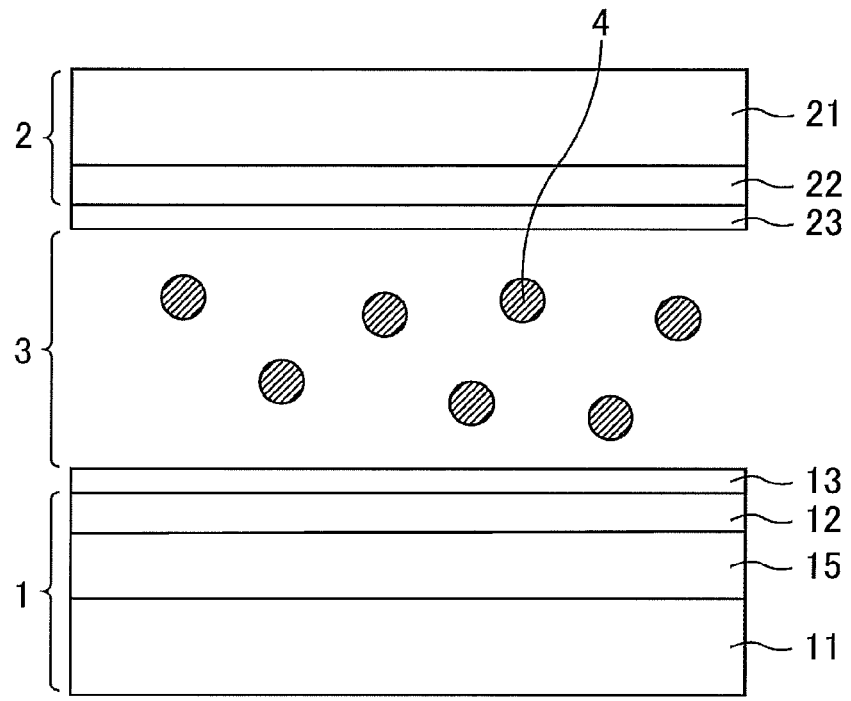
FIG. 1 is a cross-sectional view schematically illustrating a liquid crystal display device according to Embodiment 1 before a PSA polymerization step.

The present invention will be mentioned in more detail referring to the drawings in the following embodiments, but is not limited to these embodiments.

Embodiment 1

Figure 2:
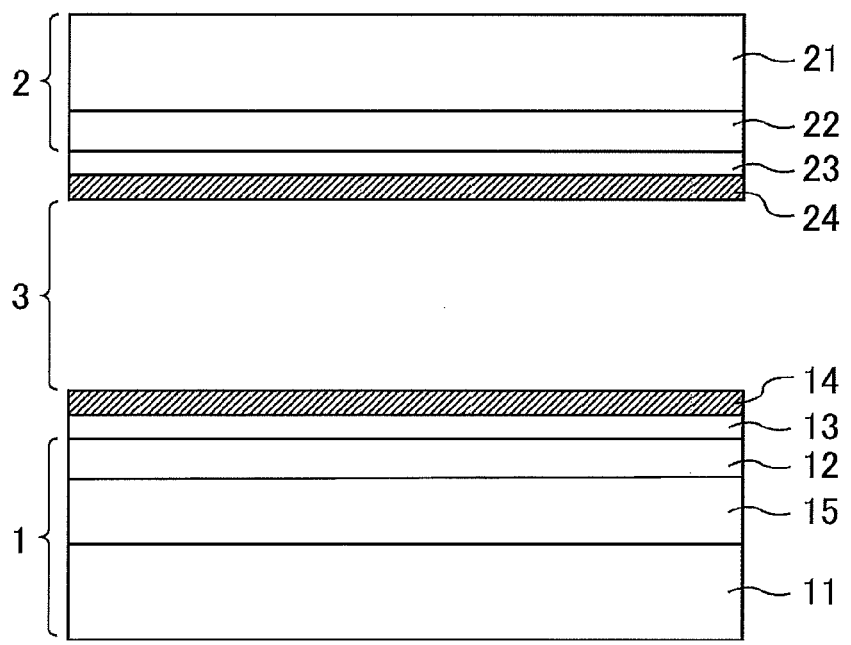
FIG. 2 is a cross-sectional view schematically illustrating a liquid crystal display device according to Embodiment 1 after a PSA polymerization step.

FIG. 1 and FIG. 2 each are a cross sectional view schematically illustrating a liquid crystal display device according to Embodiment 1. FIG. 1 illustrates the liquid crystal display device before a PSA polymerization step, and FIG. 2 illustrates the liquid crystal display device after a PSA polymerization step. As shown in FIG. 1 and FIG. 2, the liquid crystal display device according to Embodiment 1 includes an array substrate 1, a color filter substrate 2, and a liquid crystal layer 3 disposed between the pair of substrates consisting of the array substrate 1 and the color filter substrate 2. The array substrate 1 includes an insulating transparent substrate 11 made of glass or the like, on which various wirings, a pixel electrode 12, a thin film transistor (TFT), an interlayer insulating film 15 for electrically separating the various wirings and the electrode, and the like are formed. Specifically, the array substrate 1 includes the transparent substrate 11, the interlayer insulating film 15, and the pixel electrode 12 disposed in this sequence toward the liquid crystal layer. The separation of the various wirings and the pixel electrode 12 on different layers with the interlayer insulating film 15 disposed in between contributes to a design that can enhance the aperture ratio. Preferably, the interlayer insulating layer 15 is formed of organic materials and contains at least one compound selected from the group consisting of acrylic compounds, methacrylic compounds, and quinone diazide compounds. The color filter substrate 2 includes an insulating transparent substrate 21 made of glass or the like, on which a color filter, a black matrix, a common electrode 22, and the like are formed.

An alignment film 13 is formed on the array substrate 1 (i.e. on the pixel electrode 12). An alignment film 23 is formed on the color filter substrate 2 (i.e. on the common electrode 22). The alignment films 13 and 23 are each formed of a polymer material (polyimide or polyamic acid) having a main chain that contains an imide structure. The main chain has an imidization ratio of less than 50%. The surfaces of the alignment films 13 and 23 have been undergone a photo-alignment treatment so that the alignment films can allow the liquid crystal molecules to align (initially tilt) at a vertical or horizontal pretilt angle. The alignment films 13 and 23 may be formed by subjecting a vertical or horizontal alignment film to a photo-alignment treatment. The vertical alignment film refers to an alignment film capable of allowing liquid crystal molecules to initially align at an angle of approximately 90° without having undergone an alignment treatment. The horizontal alignment film refers to an alignment film capable of allowing liquid crystal molecules to initially align at an angle of approximately 0° without having undergone an alignment treatment.

In Embodiment 1, the alignment films 13 and 23 have undergone a photo-alignment treatment. Specifically, the photo-alignment treatment is performed by applying a polymer material having a side chain that includes a photoreactive functional group, followed by baking and exposure to light under a certain condition. The photoreactive functional group absorbs light including a component with a wavelength of 300 nm or longer. Specifically, the photoreactive functional group is preferably at least one functional group selected from the group consisting of a cinnamate group, a coumarin group, a chalkone group, a tolane group, and an azo benzene group. These photoreactive functional groups are relatively easily formed at side chains of polymers, and show excellent reactivity in the photo-alignment treatment.

As shown in FIG. 1, one or more species of polymerizable monomers 4 are present in the liquid crystal layer 3 before a PSA polymerization step. Polymerization of the polymerizable monomers 4 are initiated by the PSA polymerization step so that PSA layers (polymer layers) 14 and 24 are formed on the alignment films 13 and 23, respectively.

Specifically, the PSA layers 14 and 24 may be formed by injecting a liquid crystal composition that contains the one or more species of polymerizable monomers 4 and a liquid crystal material having a negative or positive dielectric constant anisotropy between the array substrate 1 and the color filter substrate 2 to form the liquid crystal layer 3, and then exposing the liquid crystal layer 3 to a certain amount of light so that the polymerizable monomers 4 are photopolymerized. FIG. 2 illustrates an embodiment in which the PSA layers 14 and 15 respectively cover the entire surfaces of the alignment films 13 and 23. Practically, a PSA layer may be formed in a dotted pattern, and may have uneven thickness.

At least one species of the polymerizable monomers 4 used in Embodiment 1 by themselves absorb light and generate radicals to initiate chain polymerization. Therefore, no polymerization initiator needs to be added.

In Embodiment 1, the PSA polymerization step may be initiated by light irradiation to the liquid crystal layer 3 to which a threshold or higher voltage is applied. As a result, a polymer is formed in accordance with the alignment of the liquid crystal molecules under a threshold or higher voltage application.

In Embodiment 1, the light irradiation may not be performed on the liquid crystal layer 3 to which a threshold or higher voltage is applied. In Embodiment 1, the alignment films 13 and 23 by themselves have a feature to allow the liquid crystal molecules to align at a pretilt angle. Thus, the PSA layers 14 and 24 formed on the respective alignment films 13 and 23 function as layers to maintain the alignment control ability of the alignment films.

At least one species of the polymerizable monomers used in Embodiment 1 generate radicals upon exposure to light including a component with a wavelength of 300 nm or longer. Examples of the monomers include condensed aromatic compounds represented by the above formula (1) and compounds represented by the above formula (3).

The polymerizable monomers are bifunctional monomers. A more stable PSA layer can be formed in a shorter period of time when such a bifunctional monomer is mixed with a liquid crystal material than when a monofunctional monomer is mixed. Moreover, substrates that have an alignment film on the surface thereof typically used in liquid crystal display devices are more likely to absorb light having a wavelength of less than 330 nm in the structure of a substrate including an alignment film. Therefore, use of monomers that absorb light including a component with a wavelength of 330 nm or longer can further enhance the light-use efficiency. Condensed aromatic compounds having a phenanthrene condensed ring represented by the above chemical formulae (2-1) to (2-4) have an absorption wavelength in a wavelength band longer than 330 nm. Therefore, use of such compounds can increase the rate of polymerization by ultraviolet ray irradiation, thereby enabling production of a stable PSA layer. Meanwhile, in Embodiment 1, as long as one or more species of polymerizable monomers having the above-mentioned properties are included, other polymerizable monomers may be used in combination.

Other elements of the liquid crystal display device according to Embodiment 1 will be described in detail below.

In the liquid crystal display device according to Embodiment 1, the array substrate 1, the liquid crystal layer 3, and the color filter substrate 2 are stacked in this sequence from the rear side to the observation side of the liquid crystal display device. A polarizer is mounted at the rear side of the array substrate 1. A polarizer is also mounted at the observation side of the color filter substrate 2. These polarizers each may be further provided with a retardation plate. These polarizers may be circular polarizers.

The array substrate 1 is provided with various drivers, such as a gate driver and a source driver, which enables to control the signal voltage application for image display in each pixel.

The liquid crystal display device according to Embodiment 1 may be any one of transmissive type, reflective type, and transmissive-and-reflective type liquid crystal display devices. In the case of transmissive type or transmissive-and-reflective type, the liquid crystal display device according to Embodiment 1 further includes a backlight. The backlight is disposed at a rear side of the array substrate 1 so that light passes through the array substrate 1, the liquid crystal layer 3, and the color filter substrate 2 in this sequence. In the case of reflective type or transmissive-and-reflective type, the array substrate 1 is provided with a reflector for reflecting external light. Moreover, at least in the region where reflected light is used for display, the polarizer of the color filter substrate 2 needs to be a circular polarizer having a $\lambda/4$ retardation plate.

The liquid crystal display device according to Embodiment 1 may have a color filter on an array structure in which the array substrate 1 includes a color filter. Moreover, the liquid crystal display device according to Embodiment 1 may be a monochrome display. In this case, a color filter is not necessary.

The liquid crystal layer 3 is filled with a liquid crystal material which has a property of being aligned in a specific direction under a certain voltage application. The alignment of the liquid crystal molecules in the liquid crystal layer 3 is controlled by application of a threshold or higher voltage. For example, use of a liquid crystal material having a negative dielectric constant anisotropy and use of a vertical alignment film as an alignment film enable to create vertical alignment (VA) mode. Moreover, for example, use of a liquid crystal material having a positive dielectric constant anisotropy and use of a horizontal alignment film as an alignment film enable to create in-plane switching (IPS) mode, fringe field switching (FFS) mode, twisted nematic (TN) mode, or optically compensated bend (OCB) mode.

A viewing angle is remarkably improved in the structure of vertical alignment twisted nematic (VATN) mode in which a pair of substrates are respectively provided with alignment films for alignment control in directions vertical to each other, and each pixel is divided into four domains. Pretilt angles need to be highly precisely controlled in VATN mode. The liquid crystal display device according to Embodiment 1 enables to provide greatly stable pretilt angles by the PSA layer formed on the alignment film. Thus, it can achieve sufficient alignment stability if it is formed to have a VATN mode structure with a plurality of domains.

A component analysis of the alignment film, a component analysis of monomers (polymerizable monomers) for forming the PSA layer present in the PSA layer, the amount of the monomers (polymerizable monomers) for forming the PSA layer included in the liquid crystal layer, the ratio of the monomers (polymerizable monomers) for forming the PSA layer in the PSA layer, or the like of the liquid crystal display device according to Embodiment 1 can be determined by disassembling the liquid crystal display device (for example, liquid crystal TV (television), DID (digital information display)), and then performing a chemical analysis based on nuclear magnetic resonance (NMR), fourier transform infrared spectroscopy (FT-IR), mass Spectrometry (MS), or the like.

Evaluation Test 1

A liquid crystal cell included in the liquid crystal display device according to Embodiment 1 was actually produced, and the effects were evaluated as follows. First, a pair of substrates were prepared. A polyamic acid solution having a photo-reactive functional group (a cinnamate group) in a side chain as a material of a vertical alignment film was applied to the surfaces of the pair of substrates using a spin coater, followed by pre-baking (temporary baking) at 80° C. for 5 minutes and subsequent post-baking (main baking) at 200° C. for 60 minutes.

The imidization ratio was calculated based on the FT-IR spectrum of the alignment film after post-baking using the expression below. The main chain had an imidization ratio in a range of more than 20% and less than 50%.

Imidization ratio(%)=[As(C—N)/As(C=C)]/[Ar(C—N)/Ar(C=C)]

The A(C—N) refers to the absorbance of imide C—N stretching (to 1370 cm$^{-1}$), and the A(C=C) refers to the absorbance of aromatic C=C stretching (to 1500 cm$^{-1}$). Moreover, As refers to the absorbance of a sample film, and the Ar refers to the absorbance of a reference film. The reference film is an alignment film formed in the same manner as the sample film, except that the main baking was performed at 300° C. for 90 minutes. The imidization ratio of the reference film was assumed 100%. Meanwhile, a degree of the imidization ratio can be controlled by the post-baking temperature.

Next, the surfaces of the substrates were exposed to polarized ultraviolet rays from an angle of 45° for photo-alignment treatment. The polarized ultraviolet rays included a component with a wavelength of 300 nm or longer.

Then, a sealing material formed of a thermosetting resin, such as epoxy resin, was applied to one of the substrates. Then, the substrates were stacked with gap support materials (plastic beads) interposed therebetween, and the sealing material was cured by heating so that the substrates were attached to each other. Thereafter, a liquid crystal composition including a liquid crystal material (negative type) having negative dielectric constant anisotropy and a polymerizable monomer for forming a PSA layer was injected via an opening disposed at a part of the sealing material by a vacuum injection method.

Polymerizable monomers represented by the following chemical formulae (5) and (6) were used in the evaluation test. The compound represented by the chemical formula (5) is a bifunctional methacrylate monomer having a phenanthrene structure, and the compound represented by the chemical formula (6) is a bifunctional methacrylate monomer having a biphenyl structure.

[Chem. 5]

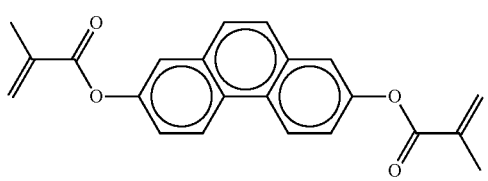

(5)

[Chem. 6]

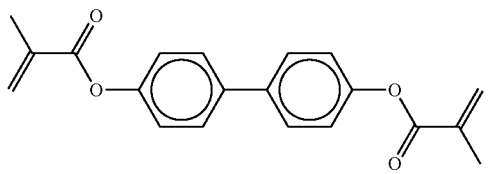

(6)

Figure 3:
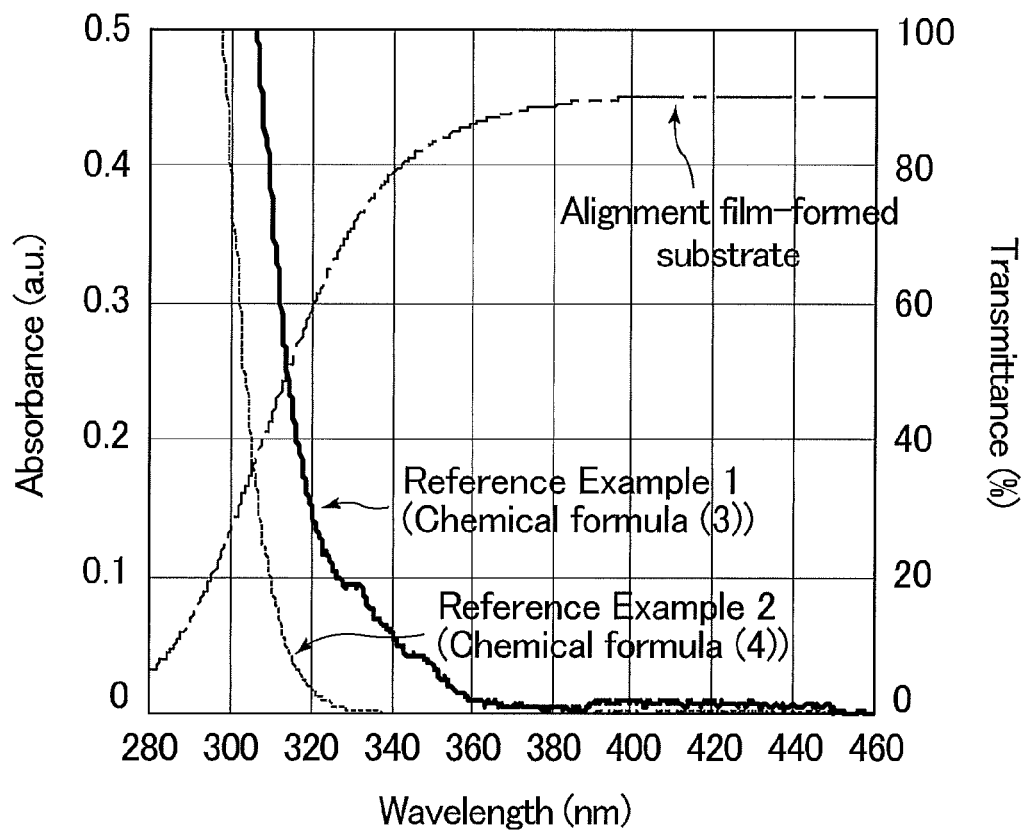
FIG. 3 is a graph showing a relationship between the transmittance (%) of an alignment film-formed substrate and the absorbances (a.u.) of monomers of Reference Examples 1 and 2.

FIG. 3 is a graph showing the absorption spectra of the compounds represented by the chemical formulae (5) and (6), and the transmission spectra of typical alignment film-formed substrates. The compound represented by the chemical formula (6) absorbs light having a wavelength of 330 nm at maximum or shorter. The compound represented by the chemical formula (5) absorbs light having a wavelength of 380 nm at maximum or shorter. Therefore, the compound represented by the chemical formula (5) can absorb light in a wavelength range of 330 nm to 380 nm that is not absorbed by the compound represented by the chemical formula (6), and thus has a broader light absorption wavelength range than the compound represented by the chemical formula (6).

The alignment film-formed substrate herein refers to a substrate in which an indium tin oxide (ITO) film is formed on a glass substrate, and an alignment film is formed on the ITO film. Typical alignment film-formed substrates tend not to transmit light having a wavelength shorter than 340 nm.

Because of the aforementioned reasons, in the case where a PSA layer is formed by exposing the liquid crystal layer to light through a typical alignment film-formed substrate, use of only the compound represented by the chemical formula (6) requires a long time until completion of the polymerization.

The liquid crystal cells actually produced were the following Samples A to C (Examples 1 to 3). Sample A was prepared by mixing a liquid crystal material A with a bifunctional methacrylate monomer represented by the chemical formula (5) in an amount of 0.6 wt % with respect to the liquid crystal material A. Sample B was prepared by mixing a liquid crystal material A with a bifunctional methacrylate monomer represented by the chemical formula (6) in an amount of 0.3 wt % with respect to the liquid crystal material A. Sample C was prepared by mixing a liquid crystal material B with a bifunctional methacrylate monomer represented by the chemical formula (5) in an amount of 0.6 wt % with respect to the liquid crystal material B.

Next, Samples A to C were exposed to black light (ultraviolet lays having a peak wavelength in a range of 300 to 370 nm (FIG. 4)) under no voltage application (the amount of the polymerizable monomer for PSA layer formation in the liquid crystal composition was set to 1% or less of the added amount) to initiate polymerization. In this manner, liquid crystal cells each having a PSA layer formed on a vertical alignment film were produced.

Thereafter, the produced Samples A to C were measured for the voltage holding ratio (VHR). The VHR was determined by measuring the charge retention after a lapse of 16.67 ms from application of a pulse voltage of 1 V. Moreover, the VHR was measured (photo degradation test) twice in total at an initial stage and at a stage after 1000-hour exposure to a light emitting diode (LED) backlight through no polarizer.

Further, the produced Samples A to C were measured for the residual DC voltage. The residual DC voltage value was determined by a flicker minimizing method after applying a DC offset voltage of 2 V for 10 hours.

Table 1 shows the results of the measurements of VHR (%) and residual DC voltage (mV) of Samples A to C.

TABLE 1

|  | Monomer - Weight ratio to liquid crystal | Liquid crystal | Initial VHR (%) | VHR (%) after 1000 hrs. | Residual DC voltage (mV) |
|---|---|---|---|---|---|
| Sample A | Chemical formula (5) - 0.6 wt % | Liquid crystal material A | 99.1 | 99.5 | 0 |
| Sample B | Chemical formula (6) - 0.3 wt % | Liquid crystal material A | 99.3 | 98.6 | 120 |
| Sample C | Chemical formula (5) - 0.6 wt % | Liquid crystal material B | 99.3 | 98.5 | 0 |

Use of the bifunctional phenanthrene monomer represented by the chemical formula (5) enabled to maintain the VHR at not less than 98.5% even after a lapse of 1000 hours, proving that long-term reliability was achieved. Moreover, the residual DC voltage was 0 mV, indicating that excellent effects of preventing image sticking phenomena were achieved. This is supposedly because: the use of the bifunctional phenanthrene monomer increased the rate of the polymerization initiated by exposure to ultraviolet rays, thereby suppressing the degradation of the liquid crystal materials; the degradation of the liquid crystal materials and the alignment film materials caused by exposure to light having a short wavelength of less than 330 nm was suppressed; the polymer layer blocked the ultraviolet rays contained in the backlight after the polymerization process; or other reasons. Moreover, use of the bifunctional phenanthrene monomer represented by the chemical formula (5) suppressed decrease in the voltage holding ratio and prevented generation of residual DC voltage, regardless of the kinds of the liquid crystal materials.

Use of the bifunctional biphenyl monomer represented by the chemical formula (6), which has a similar structure as that of the bifunctional phenanthrene monomer represented by the chemical formula (5), produced an effect of suppressing decrease in the voltage holding ratio. However, since the bifunctional biphenyl monomer represented by the chemical formula (6) is a monomer that generates radicals upon exposure mainly to light having a wavelength shorter than 330 nm, it did not produce a sufficient effect for preventing image sticking phenomena, unlike the bifunctional phenanthrene monomer represented by the chemical formula (5).

Evaluation Test 2

Next, a test was performed to examine the influence on the voltage holding ratio derived from the difference in the imidization ratio of the main chain of a polymer material that formed an alignment film. Samples prepared for this evaluation test had not undergone PSA treatment. Two kinds of alignment film materials, i.e., those having and those not having a photo-reactive functional group (cinnamate group) in a side chain were used. Samples D and E (Comparative Examples 1 and 2, respectively) were prepared as the samples having a photo-reactive functional group in a side chain, and Samples F and G (Comparative Examples 3 and 4, respectively) were prepared as the samples not having a photo-reactive functional group in a side chain. In Samples D and E, the polymer materials forming the alignment film after post-baking had a main chain having an imidization ratio of approximately 80%. In Samples F and G, the polymer materials forming the alignment film after post-baking had a main chain having an imidization ratio of approximately in a range of 20 to 50%.

The liquid crystal material enclosed in Sample D was different from that in Sample E, and the liquid crystal material enclosed in Sample F was different from that in Sample G. The liquid crystal material A was enclosed in Sample D and Sample F, and the liquid crystal material B was enclosed in Sample E and G. Tables 2 and 3 below show the results. The VHR was determined by measuring the charge retention after a lapse of 16.67 ms from application of a pulse voltage of 1 V. Moreover, the VHR was measured (photo degradation test) twice in total at an initial stage and at a stage after 1000-hour exposure to a light emitting diode (LED) backlight through no polarizer.

TABLE 2

|  | Liquid crystal | Initial VHR (%) | VHR (%) after 1000 hrs. |
|---|---|---|---|
| Sample D | Liquid crystal material A | 99.3 | 99.2 |
| Sample E | Liquid crystal material B | 99.2 | 98.5 |

TABLE 3

|  | Liquid crystal | Initial VHR (%) | VHR (%) after 1000 hrs. |
|---|---|---|---|
| Sample F | Liquid crystal material A | 99.3 | 99.2 |
| Sample G | Liquid crystal material B | 99.1 | 95.4 |

Comparison between Table 2 and Table 3 indicates that the dependency of the voltage holding ratio on the liquid crystal materials was high in the liquid crystal cell (Table 2) in which the alignment film material used was the polymer material having a side chain that contained a photo-reactive functional group and a main chain that had an imidization ratio of not less than 50% than in the liquid crystal cell (Table 3) in which the alignment film material used was the polymer material having a side chain that contained no photo-reactive functional group and a main chain that had an imidization ratio of less than 50%.

Thus, in the case of using the liquid crystal cell in which the polymer material having a side chain that contains a photo-reactive functional group and a main chain that has an imidization ratio of less than 50% is used as an alignment film material, use of the compound represented by the chemical formula (5) for formation of a PSA layer produces an advantageous effect, as in the present invention.

The liquid crystal material B has a low viscosity and excellent video imaging performance. As shown in Table 3, however, it shows great reduction in the voltage holding ratio depending on the conditions. This is supposedly due to degradation of the liquid crystal material caused by the exposure to ultraviolet rays for forming the PSA layer. The reduction in the voltage holding ratio is preventable if the compound represented by the chemical formula (5) is used for formation of the PSA layer.

Evaluation Test 3

A liquid crystal cell included in the liquid crystal display device according to Embodiment 1 was actually produced, and the effects were evaluated as follows. First, a pair of substrates were prepared. A polyamic acid solution having a photo-reactive functional group (a cinnamate group), which absorbs light including a component with a wavelength of 300 nm or longer, in a side chain as a material of a horizontal alignment film was applied to the surfaces of the pair of substrates using a spin coater, followed by pre-baking (temporary baking) at 80° C. for 5 minutes and subsequent post-baking (main baking) at 200° C. for 60 minutes.

Next, the surfaces of the substrates were exposed to polarized ultraviolet rays from an angle of 45° for photo-alignment treatment. The polarized ultraviolet rays included a component with a wavelength of 300 nm or longer.

Then, a sealing material formed of a thermosetting resin, such as epoxy resin, was applied to one of the substrates. Then, the substrates were stacked with gap support materials (plastic beads) interposed therebetween, and the sealing material was cured by heating so that the substrates were attached to each other. Thereafter, a liquid crystal composition including a liquid crystal material (positive type) having positive dielectric constant anisotropy and a polymerizable monomer for forming a PSA layer was injected via an opening disposed at a part of the sealing material by a vacuum injection method.

The polymerizable monomers represented by the chemical formulae (5) and (6) were used in the evaluation test. The compound represented by the chemical formula (5) is a bifunctional methacrylate monomer having a phenanthrene structure, and the compound represented by the chemical formula (6) is a bifunctional methacrylate monomer having a biphenyl structure.

The liquid crystal cells actually produced were the following Samples H and I (Examples 4 and 5). Sample H was prepared by mixing a liquid crystal material H with a bifunctional methacrylate monomer represented by the chemical formula (5) in an amount of 0.6 wt % with respect to the liquid crystal material H. Sample I was prepared by mixing a liquid crystal material H with a bifunctional methacrylate monomer represented by the chemical formula (6) in an amount of 0.3 wt % with respect to the liquid crystal material H.

Next, Samples H and I were exposed to black light (ultraviolet lays having a peak wavelength in a range of 300 to 370 nm (FIG. 4)) under no voltage application (the amount of a polymerizable monomer for PSA layer formation in the liquid crystal composition was set to 1% or less of the added amount) to initiate polymerization. In this manner, liquid crystal cells each having a PSA layer formed on a horizontal alignment film were produced.

Table 4 below shows the results. The VHR and the residual DC voltage were measured in the same manner as in Evaluation Test 1.

TABLE 4

| | Monomer - Weight ratio to liquid crystal | Liquid crystal | Initial VHR (%) | VHR (%) after 1000 hrs. | Residual DC voltage (mV) |
|---|---|---|---|---|---|
| Sample H | Chemical formula (5) - 0.6 wt % | Liquid crystal material H | 99.4 | 99.6 | 0 |
| Sample I | Chemical formula (6) - 0.3 wt % | Liquid crystal material H | 99.2 | 98.1 | 140 |

Similarly to the case of using the vertical alignment film, use of the bifunctional phenanthrene monomer represented by the chemical formula (5) enabled to maintain the VHR at not less than 98.5% even after a lapse of 1000 hours, proving that long-term reliability was achieved. Moreover, the residual DC voltage was 0 mV, indicating that excellent effects of preventing image sticking phenomena were achieved. This is supposedly because: the use of the bifunctional phenanthrene monomer increased the rate of the polymerization initiated by exposure to ultraviolet rays, thereby suppressing the degradation of the liquid crystal materials; the degradation of the liquid crystal materials and the alignment film materials caused by exposure to light having a short wavelength of less than 330 nm was suppressed; the polymer layer blocked the ultraviolet rays contained in the backlight after the polymerization process; or other reasons.

Use of the bifunctional biphenyl monomer represented by the chemical formula (6) enabled to maintain the VHR at not less than 98.0% even after a lapse of 1000 hours. Accordingly, in the case of using the horizontal alignment film as well, long-term reliability was achieved. However, the bifunctional biphenyl monomer represented by the chemical formula (6) did not produce a sufficient effect for preventing image sticking phenomena, unlike the bifunctional phenanthrene monomer represented by the chemical formula (5).

The results of Evaluation Test 3 prove that the use of the horizontal alignment-type photo-alignment materials produces the same effects as those produced in the case of using the vertical alignment-type photo-alignment materials.

Evaluation Test 4

A liquid crystal cell included in the liquid crystal display device according to Embodiment 1 was actually produced, and the effects were evaluated as follows. First, a pair of substrates consisting of a substrate having an interlayer insulating layer formed of an organic material and a substrate having no interlayer insulating layer were prepared. A polyamic acid solution having a photo-reactive functional group (a cinnamate group), which absorbs light including a component with a wavelength of 300 nm or longer, in a side chain as a material of a horizontal alignment film was applied to the surfaces of the pair of substrates using a spin coater, followed by pre-baking (temporary baking) at 80° C. for 5 minutes and subsequent post-baking (main baking) at 200° C. for 60 minutes.

Next, the surfaces of the support substrates were exposed to polarized ultraviolet rays from an angle of 45° for photo-alignment treatment. The polarized ultraviolet rays included a component with a wavelength of 300 nm or longer.

Then, a sealing material formed of a thermosetting resin, such as epoxy resin, was applied to one of the substrates. Then, the substrates were stacked with gap support materials (plastic beads) interposed therebetween, and the sealing material was cured by heating so that the substrates were attached to each other. Thereafter, a liquid crystal composition including a liquid crystal material (positive type) having positive dielectric constant anisotropy and a polymerizable monomer for forming a PSA layer was injected via an opening disposed at a part of the sealing material by a vacuum injection method.

The polymerizable monomers represented by the chemical formulae (5) and (6) were used in the evaluation test. The compound represented by the chemical formula (5) is a bifunctional methacrylate monomer having a phenanthrene structure, and the compound represented by the chemical formula (6) is a bifunctional methacrylate monomer having a biphenyl structure.

The liquid crystal cells actually produced were the following Samples J and K (Examples 6 and 7). Sample J was prepared by mixing a liquid crystal material J with a bifunctional methacrylate monomer represented by the chemical formula (5) in an amount of 0.3 wt % with respect to the liquid crystal material J. Sample K was prepared by mixing a liquid crystal material J with a bifunctional methacrylate monomer represented by the chemical formula (6) in an amount of 0.3 wt % with respect to the liquid crystal material J.

Next, Samples H and I were exposed to black light (ultraviolet lays having a peak wavelength in a range of 300 to 370 nm (FIG. 4)) that was irradiated from the side of the substrate having an interlayer insulating layer formed of an organic material under no voltage application (the amount of a polymerizable monomer for PSA layer formation in the liquid crystal composition was set to 1% or less of the added amount) to initiate polymerization. In this manner, liquid crystal cells each having a PSA layer formed on a horizontal alignment film were produced.

Figure 5:
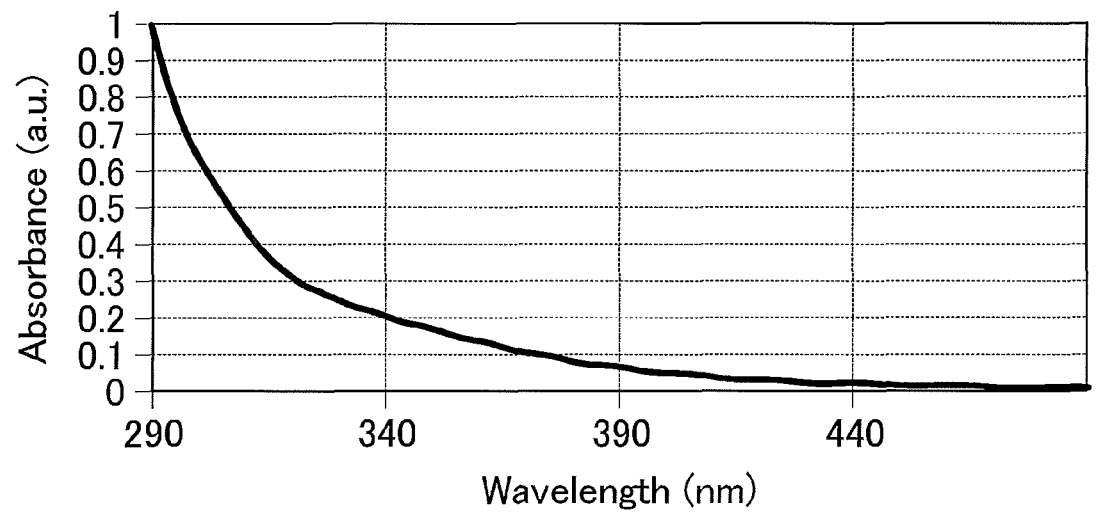
FIG. 5 is a graph showing an absorption spectrum of an organic material used in Samples J and K.

FIG. 5 is a graph showing the absorption spectrum of the organic material used in Samples J and K. Examples of the compounds which may be included in the organic material include acrylic compounds, methacrylic compounds, and quinone diazide compounds. Organic materials including those compounds have similar absorption spectra.

Figure 6:
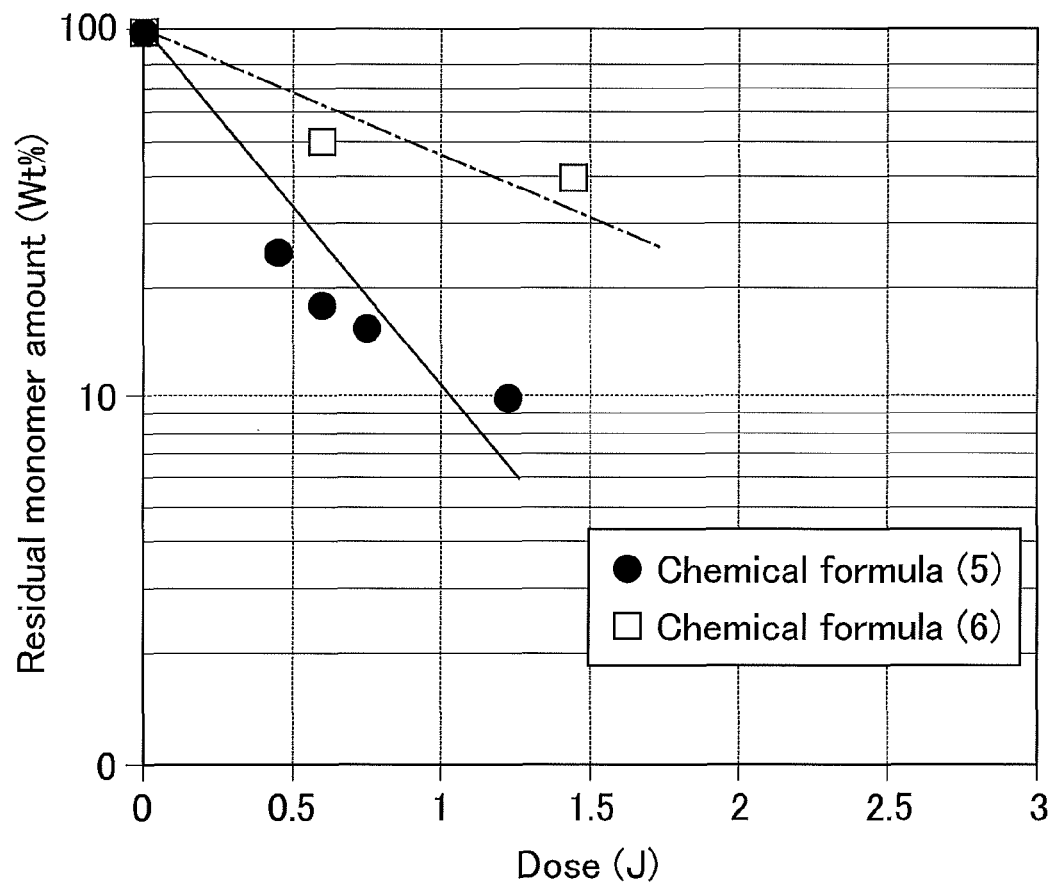
FIG. 6 is a graph showing results of the measurement of polymerizable monomer contents in liquid crystal compositions after polymerization is initiated by exposure to different ultraviolet ray irradiation doses for each of Samples J and K.

FIG. 6 is a graph showing results of the measurement of polymerizable monomer contents in liquid crystal compositions after polymerization is initiated by exposure to different ultraviolet ray irradiation doses for each of Samples J and K. The amount of the polymerizable monomer remaining in the liquid crystal composition can be measured by a liquid chromatography mass spectrometry or gas chromatography mass spectrometry. The graph in FIG. 6 shows the results obtained by a gas chromatography mass spectrometry.

Figure 4:
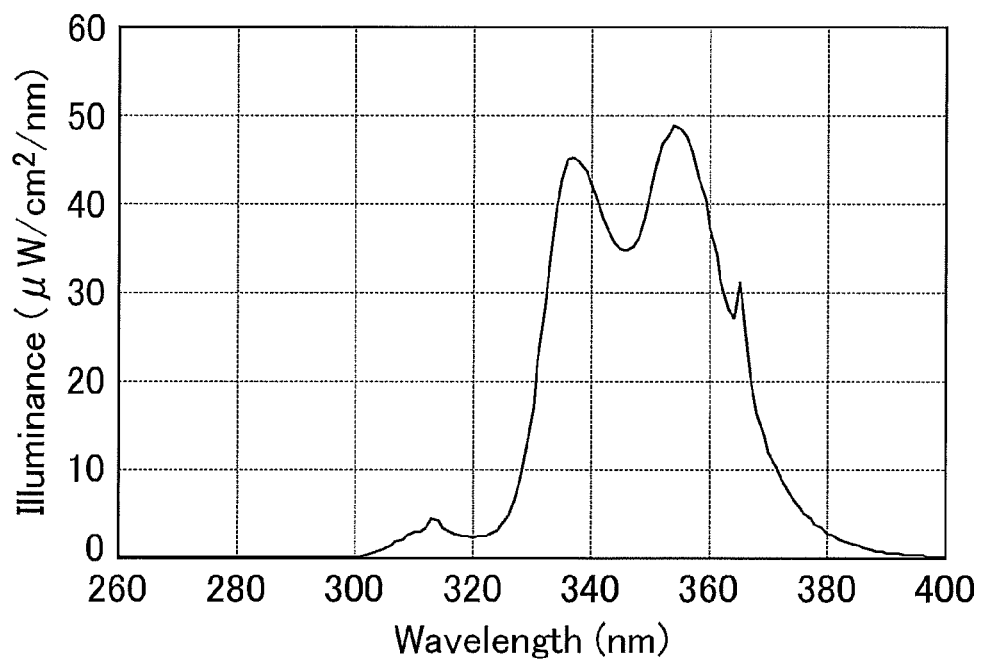
FIG. 4 is a graph showing an emission spectrum of a ultraviolet ray source in Evaluation Test 1.

Comparison between FIG. 4 and FIG. 5 shows that light of a certain wavelength with high intensity emitted from a black light source partly corresponds to light of a certain wavelength easily adsorbed by the organic material. Thus, part of light emitted from the black light source is absorbed by the organic material. As shown in FIG. 6, if an interlayer insulating layer formed of an organic material is formed, the monomer that generates radicals upon exposure to light having a wavelength of 330 nm or longer can be readily polymerized so that a PSA layer is formed on the alignment film.

As shown in FIG. 6, the amount of residual monomers can be reduced by increasing the irradiation dose even in the case of using the bifunctional biphenyl monomer represented by the chemical formula (6). The use of the bifunctional phenanthrene monomer represented by the chemical formula (5) enables to more efficiently reduce the amount of residual monomers.

The present application claims priority to Patent Application No. 2011-142347 filed in Japan on Jun. 27, 2011 and priority to Patent Application No. 2011-199613 filed in Japan on Sep. 13, 2011 under the Paris Convention and provisions of national law in a designated State, the entire contents of which are hereby incorporated by reference.

REFERENCE SIGNS LIST

1: Array substrate
2: Color filter substrate
3: Liquid crystal layer
4: Polymerizable monomer
11, 21: Transparent substrate
12: Pixel electrode
13, 23: Alignment film
14, 24: PSA layer (polymer layer)
22: Common electrode

The invention claimed is:
1. A liquid crystal display device comprising
a pair of substrates,
a liquid crystal layer having a negative or positive dielectric constant anisotropy disposed between the pair of substrates,
an alignment film formed on at least one of the pair of substrates, and
a first polymer layer for controlling the alignment of liquid crystal molecules formed on the alignment film,
wherein the first polymer layer is formed by polymerization of one or more species of monomers added in the liquid crystal layer,
the alignment film is formed by subjecting a second polymer material to a photo-alignment treatment comprising exposure to polarized ultraviolet rays including a component with a wavelength of 300 nm or longer, the second polymer material containing a compound including a main chain that contains an imide structure and a side chain that contains a photoreactive functional group which includes at least one selected from the group consisting of a cinnamate group, a coumarin group, a chalcone group, a tolane group, and an azo benzene group, the main chain having an imidization ratio of more than 20% and less than 50%,
wherein the alignment film is a vertical alignment film when the liquid crystal layer has a negative dielectric constant anisotropy,
and the alignment film is a horizontal alignment film when the liquid crystal layer has a positive dielectric constant anisotropy;
and the one or more species of monomers are condensed aromatic compounds represented by the following chemical formula (1):

[Chem. 1]

$$P^1\text{-}A^1\text{-}P^1 \qquad (1)$$

wherein $P^1$s are each independently an acrylate group or a methacrylate group; and $A^1$ is represented by the following chemical formula (2-1):

[Chem. 2]

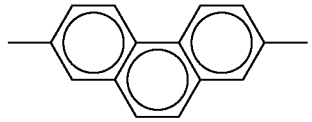

(2-1)

wherein a hydrogen atom in $A^1$ may be substituted with a halogen group, a methyl group, an ethyl group, or a propyl group.
2. The liquid crystal display device according to claim 1, wherein the photoreactive functional group absorbs light including a component with a wavelength of 300 nm or longer, and
the alignment film aligns the liquid crystal molecules in a substantially vertical direction to a surface of the alignment film.
3. The liquid crystal display device according to claim 1, wherein the photoreactive functional group absorbs light including a component with a wavelength of 300 nm or longer, and the alignment film aligns the liquid crystal molecules in a substantially horizontal direction to a surface of the alignment film.

4. The liquid crystal display device according to claim 1, wherein the one or more species of monomers generate radicals upon exposure to light including a component with a wavelength of 330 nm or longer.

5. The liquid crystal display device according to claim 1, wherein one of the pair of substrates is an array substrate including a transparent substrate, an interlayer insulating film, and a pixel electrode disposed in this sequence toward the liquid crystal layer, and the interlayer insulating film is formed of an organic material.

6. A method for producing a liquid crystal display device comprising the steps of:

injecting a liquid crystal composition containing a liquid crystal material and one or more species of monomers between a pair of substrates to form a liquid crystal layer having a negative or positive dielectric constant anisotropy;

forming an alignment film by applying an alignment film material to at least one of the pair of substrates and subjecting the alignment film material to a photo-alignment treatment comprising exposure to polarized ultraviolet rays including a component with a wavelength of 300 nm or longer, wherein the alignment film material contains a compound including a main chain that contains an imide structure and a side chain that contains a photoreactive functional group which includes at least one selected from the group consisting of a cinnamate group, a coumarin group, a chalcone group, a tolane group, and an azo benzene group, the main chain having an imidization ratio of more than 20% and less than 50%, wherein the alignment film is a vertical alignment film when the liquid crystal layer has a negative dielectric constant anisotropy, and the alignment film is a horizontal alignment film when the liquid crystal layer has a positive dielectric constant anisotropy;

forming a polymer layer for controlling the alignment of liquid crystal molecules on the alignment film by exposing the liquid crystal composition to light to allow at least one of the one or more species of monomers to initiate polymerization, and the one or more species of monomers are condensed aromatic compounds represented by the following chemical formula (1):

[Chem. 3]

$$P^1\text{-}A^1\text{-}P^1 \qquad (1)$$

wherein $P^1$s are each independently an acrylate group or a methacrylate group; and $A^1$ is represented by the following chemical formula (2-1):

[Chem. 4]

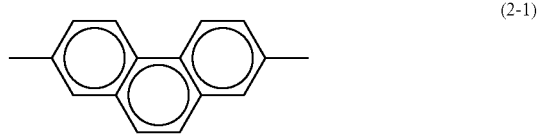

(2-1)

wherein a hydrogen atom in $A^1$ may be substituted with a halogen group, a methyl group, an ethyl group, or a propyl group.

7. The method for producing a liquid crystal display device according to claim 6, wherein the alignment film aligns the liquid crystal molecules in a substantially vertical direction to a surface of the alignment film.

8. The method for producing a liquid crystal display device according to claim 6, wherein the alignment film aligns the liquid crystal molecules in a substantially horizontal direction to a surface of the alignment film.

9. The method for producing a liquid crystal display device according to claim 6, wherein the one or more species of monomers generate radicals upon exposure to light including a component with a wavelength of 330 nm or longer.

10. The method for producing a liquid crystal display device according to claim 6, wherein one of the pair of substrates is an array substrate including a transparent substrate, an interlayer insulating film, and a pixel electrode disposed in this sequence toward a liquid crystal layer, and the interlayer insulating film is formed of an organic material.

11. The method for producing a liquid crystal display device according to claim 6, wherein the step of forming a polymer layer comprises light irradiation to a liquid crystal layer to which a threshold or higher voltage is applied to initiate the polymerization.

12. The method for producing a liquid crystal display device according to claim 6, wherein the step of forming a polymer layer comprises light irradiation to a liquid crystal layer to which a threshold or higher voltage is not applied to initiate the polymerization.

* * * * *